United States Patent
Wang

(10) Patent No.: US 9,921,617 B1
(45) Date of Patent: Mar. 20, 2018

(54) SECURING MECHANISM FOR DATA STORAGE DEVICE

(71) Applicant: ScienBiziP Consulting (Shen Zhen) Co., Ltd., Shenzhen (CN)

(72) Inventor: Peng-Kuei Wang, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/397,738

(22) Filed: Jan. 4, 2017

(30) Foreign Application Priority Data

Nov. 16, 2016 (CN) .......................... 2016 1 1007469

(51) Int. Cl.
*G06F 1/18* (2006.01)
*G11B 33/00* (2006.01)
*G11B 33/02* (2006.01)

(52) U.S. Cl.
CPC ............ *G06F 1/187* (2013.01); *G11B 33/005* (2013.01); *G11B 33/027* (2013.01)

(58) Field of Classification Search
CPC ........................................................ G06F 1/187
USPC ..................................................... 361/679.33
See application file for complete search history.

(56) References Cited

U.S. PATENT DOCUMENTS

| | | | | |
|---|---|---|---|---|
| 6,219,231 B1* | 4/2001 | Nabetani | ............... | G06K 7/0082 361/679.32 |
| 6,469,900 B2* | 10/2002 | Cheng | ................... | G06F 1/1616 248/551 |
| 6,643,139 B2* | 11/2003 | Tien | ....................... | G06F 1/1616 292/148 |
| 2007/0070595 A1* | 3/2007 | Chen | ....................... | G06F 1/187 361/679.37 |
| 2007/0094678 A1* | 4/2007 | Tu | ........................... | G11B 33/12 720/657 |

* cited by examiner

*Primary Examiner* — Adrian S Wilson
(74) *Attorney, Agent, or Firm* — ScienBiziP, P.C.

(57) ABSTRACT

A data storage device securing mechanism for convenient assembly and disassembly of a data storage device includes a bracket and two latch members. The bracket includes a bottom plate and a first side plate connected with one side of the bottom plate. The first side plate includes a limiting plate and a latch member is secured on the first side plate. One end of each latch member is hooked, and the limiting plate is configured to be elastically deformed to slide the latch member relative to the bracket. The hook is abutted the limiting plate to prevent the limiting plate from rebounding.

20 Claims, 6 Drawing Sheets

SECURING MECHANISM FOR DATA STORAGE DEVICE

CROSS-REFERENCE TO RELATED APPLICATIONS

This application claims priority to Chinese Patent Application No. 201611007469.3 filed on Nov. 16, 2016 the contents of which, are incorporated by reference herein.

FIELD

The subject matter herein generally relates to a securing mechanism for data storage device.

BACKGROUND

When installing a data storage device, such as a hard disk drive, to an electronic device, the data storage device is generally secured to a securing mechanism, and then the securing mechanism is installed into the electronic device together with the hard drive.

BRIEF DESCRIPTION OF THE DRAWINGS

Implementations of the present technology will now be described, by way of example only, with reference to the attached figures.

DETAILED DESCRIPTION

Figure 1:
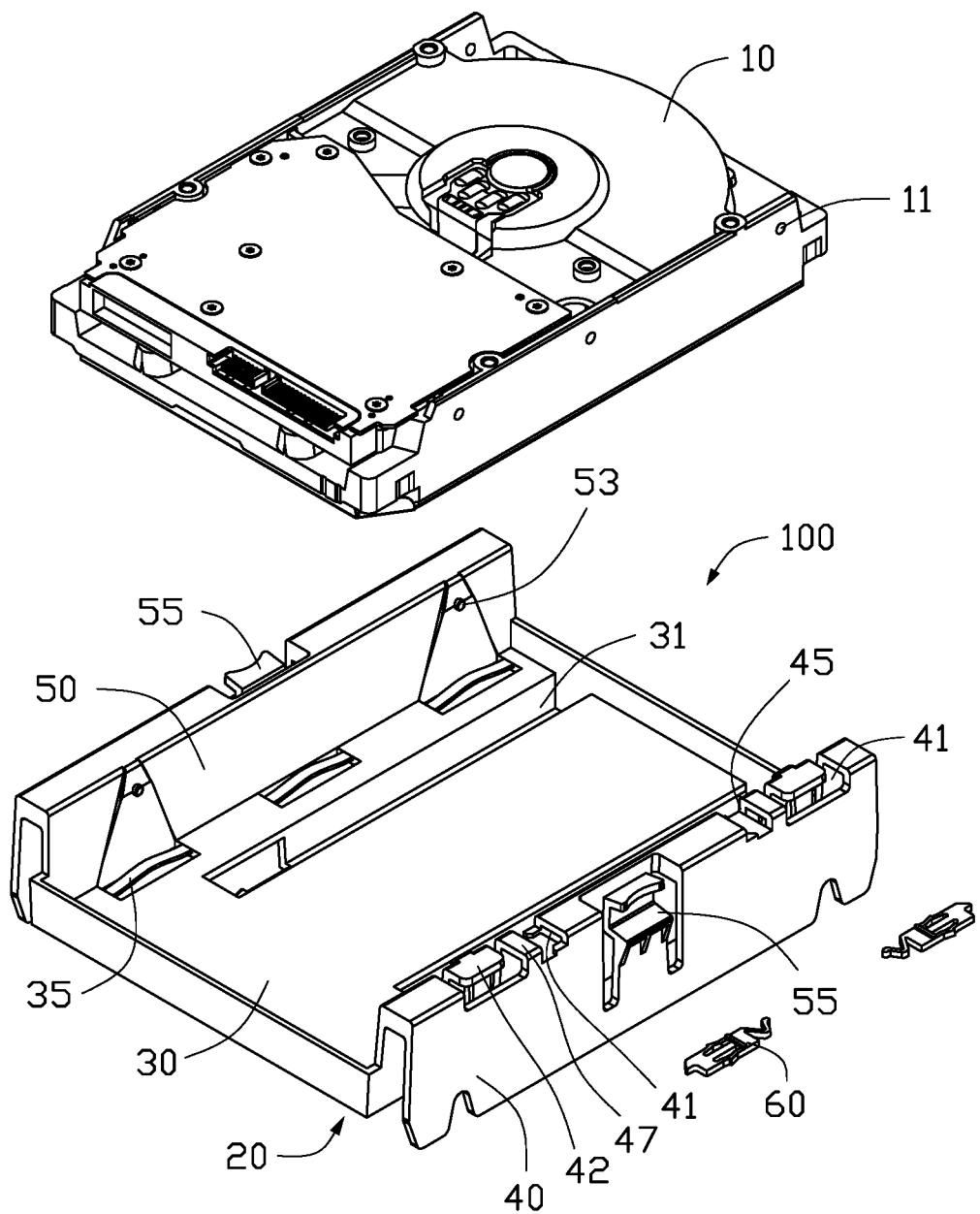
FIG. 1 is an isometric, exploded view of an exemplary embodiment of a data storage device and a securing mechanism for the data storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates an exemplary embodiment of a data storage device securing mechanism 100 configured for convenient disassembly and assembly of a data storage device 10. The data storage device securing mechanism 100 includes a bracket 20 configured to receive the data storage device 10 and two latch members 60 installed on the bracket 20.

Opposite sides of the data storage device 10 each define a securing hole 11. The bracket 20 is installed on the two sides of the data storage device 10 through the securing holes 11.

Figure 2:
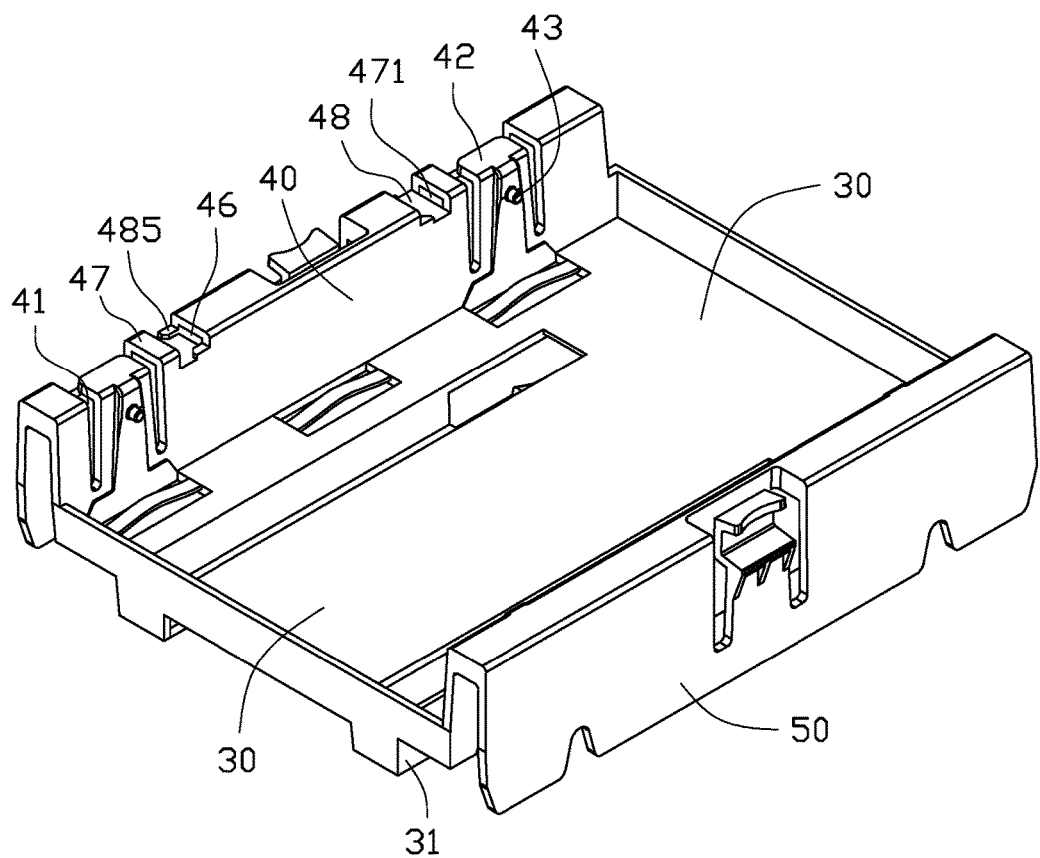
FIG. 2 is an isometric view of a bracket of the securing mechanism of FIG. 1.

FIGS. 1-2 illustrate an exemplary embodiment of a bracket 20, the bracket 20 includes a bottom plate 30, a first side plate 40, and a second side plate 50. The first side plate 40 and the second side plate 50 are perpendicularly connected to opposite sides of the bottom plate 30. The bottom plate 30 has a limiting strip 31 close to the first side plate 40 and to the second side plate 50, and each limiting strip 31 is configured to secure the bracket 20 on a chassis (not shown). The bottom plate 30 is further provided with a plurality of resilient pieces 35 configured to abut the bottom of the data storage device 10 to elastically support the data storage device 10.

A center of each of the first side plate 40 and the second side plate 50 has an operating portion 55, and the operating portion 55 is configured to pull on the first side plate 40 and the second side plate 50. In FIG. 2, the first side plate 40 defines two grooves 41. A limiting plate 42 is placed in each groove 41 and is elastically deformable. An inner surface of each limiting plate 42 has a positioning column 43 extended in the direction of the second side plate 50. The positioning column 43 is configured to be inserted into the securing hole 11 of the data storage device 10.

Figure 4:
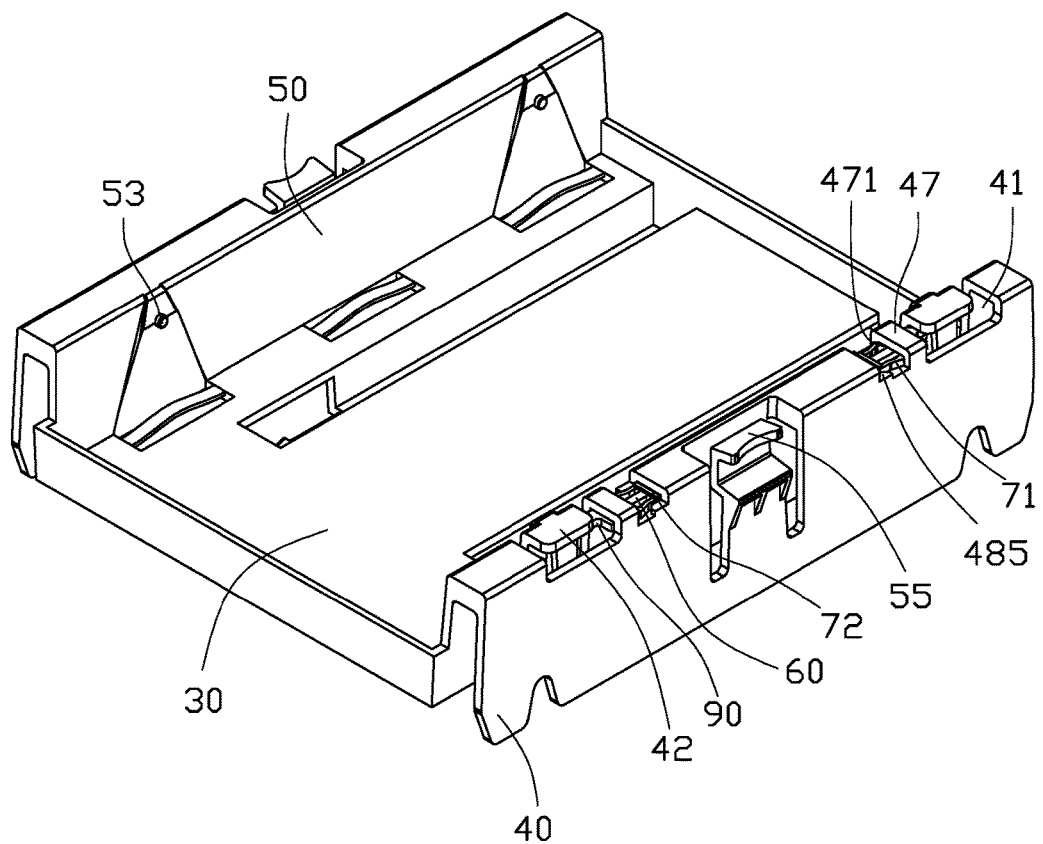
FIG. 4 is an assembled, isometric view of the bracket and the latch member of FIG. 1.

In FIG. 1, the first side plate 40 is further provided with two mounting portions 45 between the two grooves 41. The two mounting portions 45 are placed adjacent to opposite ends of the operating portion 55. In FIG. 2, each mounting portion 45 defines a cavity 46 away from the adjacent groove 41, and each mounting portion 45 has a securing plate 47 adjacent to groove 41. The cavity 46 is configured to receive the latch member 60. A through hole 471 in air communication with the groove 41 is defined between the securing plate 47 and the first side plate 40, and the latch member 60 can pass through the through hole 471 as shown in FIG. 4. A gap 48 is formed between the cavity 46 and the securing plate 47. Two latching plates 485 are respectively located at two sides of the cavity 46. The latch plate 485 is configured to abut above the latch member 60 to prevent the latch member 60 from waggling.

In FIG. 1, the second side plate 50 has two positioning columns 53 in the direction of the first side plate 40. The positioning column 53 is configured to be inserted into the securing hole 11 of the data storage device 10.

Figure 3:
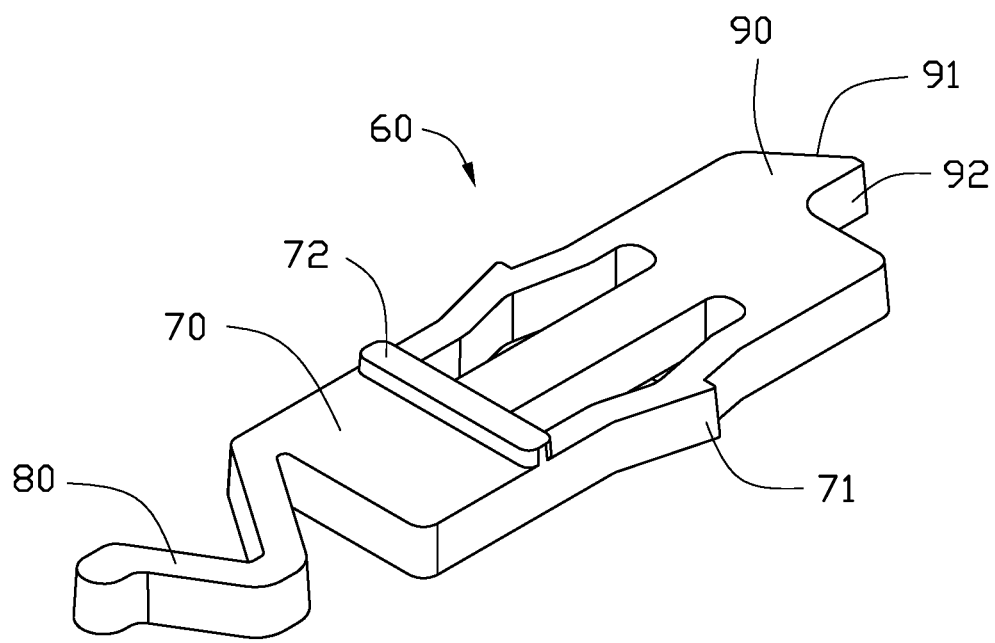
FIG. 3 is another isometric view of a latch member of the securing mechanism of FIG. 1.

FIG. 3 illustrates that the latch member 60 includes a body 70, a resilient arm 80 connected to one end of the body 70, and a hook 90 connected to the other end of the body 70. Each side of the body 70 has a barb 71, which is configured to be elastically deformed to pass through the through hole 471. A stopper block 72 is on a surface of the body 70. In FIG. 4, the stopper block 72 can abut the top edge of the cavity 46. The resilient arm 80 is generally V-shaped and is elastically connected to one end of the body 70. The resilient arm 80 is configured to be elastically deformed when the body 70 slides. The hook 90 has an inclining surface 91 and a stopping surface 92, and the stopping surface 92 is configured to abut the limiting plate 42 as shown in FIG. 6.

FIG. 4 illustrates the exemplary data storage device securing mechanism 100 when assembled. The latch member 60 is on the bracket 20 and is slid to the cavity 46 from the securing plate 47. The resilient arm 80 passes through the through hole 471 and the gap 48 to be received into the cavity 46. The barbs 71 of both sides of the body 70 are elastically deformed to pass through the through hole 471, and upon recovering elastically, the barbs 71 abut the securing plate 47 after passing through the through hole 471. Then, the latch member 60 is secured on the bracket 20. The latch plate 485 is abutted the body 70, and the inclining surface 91 of the hook 90 abuts the limiting plate 42. In the same way, the other latch member 60 is secured on the bracket 20. Thus, the data storage device securing mechanism 100 is assembled.

Figure 5:
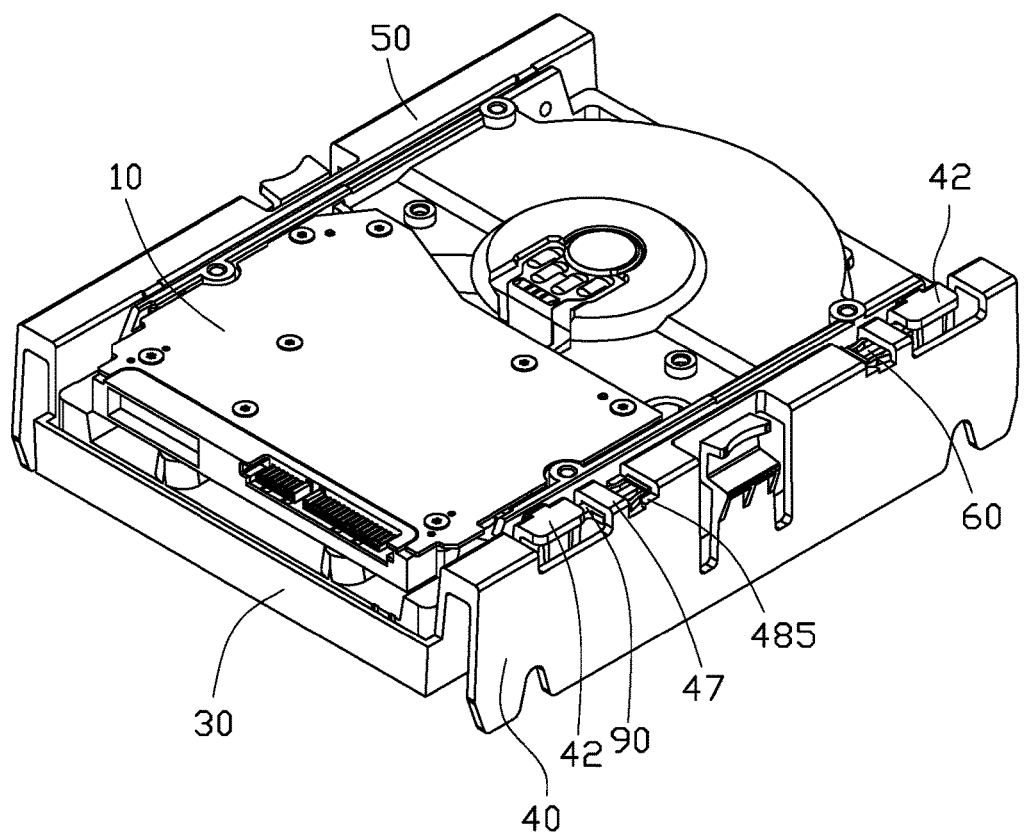
FIG. 5 is an assembled, isometric view of the securing mechanism and the data storage device of FIG. 1.
Figure 6:
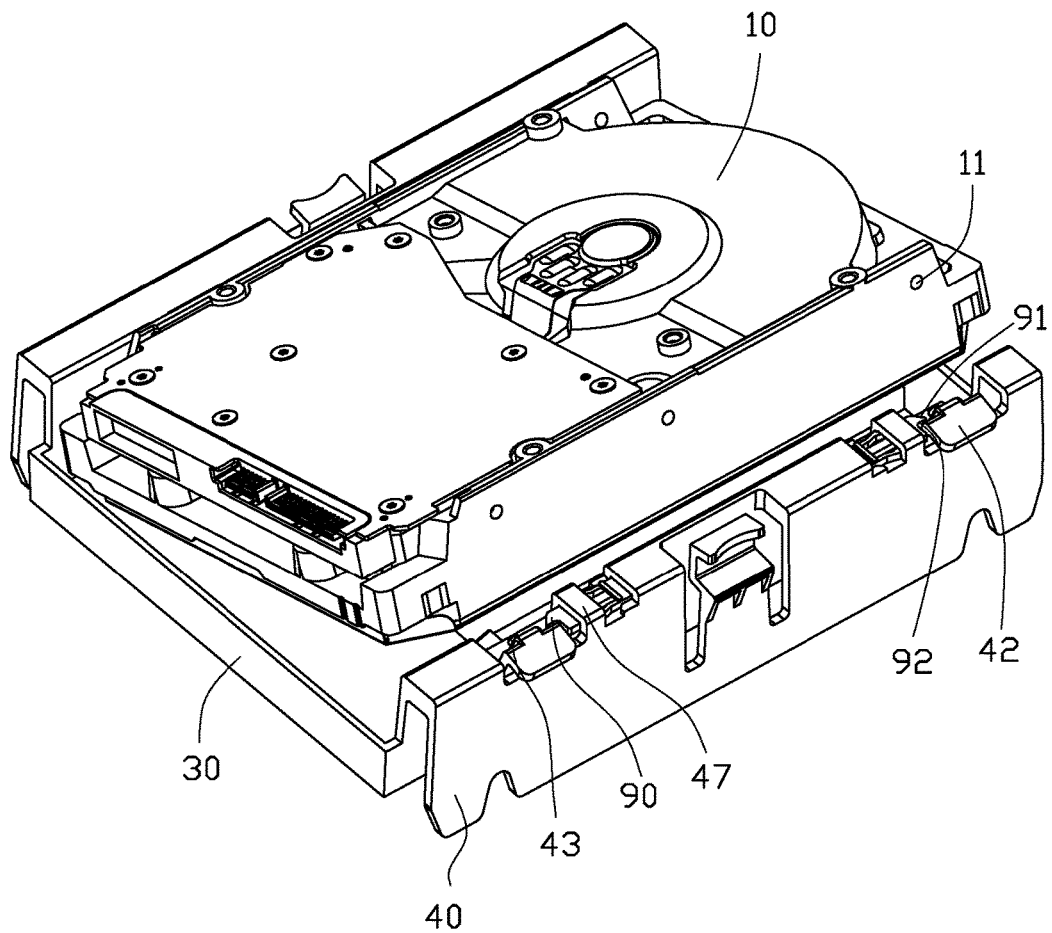
FIG. 6 is a disassembled, isometric view of the data storage device securing mechanism and the data storage device of FIG. 1.

FIGS. 5 and 6 illustrate installation of the data storage device 10. One side close to the second side plate 50 of the data storage device 10 is slantingly placed on the bottom plate 30. The positioning columns 53 of the second side plate 50 are inserted into the securing holes 11 of one side of the data storage device 10. The limiting plate 42 of the first side plate 40 is pulled towards the second side plate 50 to press the inclining surface 91 of the hook 90. The latch member 60 is moved towards the cavity 46 and the resilient arm 80 is elastically compressed. The limiting plate 42 is pushed until the limiting plate 42 is slid over the hook 90. The resilient arm 80 elastically recovers and the stopping surface 92 of the hook 90 abuts the limiting plate 42 to prevent the limiting plate 42 from elastically recovering. At this time, the data storage device securing mechanism 100 is in an unlocked state.

The other side of the data storage device 10 is on the bottom plate 30. The latch member 60 is pushed towards the cavity 46, and the limiting plate 42 elastically recovers. The positioning columns 43 of the limiting plate 42 are inserted into the securing holes 11 of the other side of the data storage device 10. At this time, the data storage device securing mechanism 100 is in a locked state, and the data storage device is installed on the data storage device securing mechanism 100.

When the data storage device 10 needs to be disassembled, the limiting plate 42 is pulled towards the second side plate 50. The positioning column 43 of the limiting plate 42 disengages from the securing hole 11. The limiting plate 42 presses against the inclining surface 91 of the hook 90, the latch member 60 is moved towards the cavity 46, and the resilient arm 80 is elastically compressed. The limiting plate 42 can be pushed until the limiting plate 42 is slid over the hook 90. The resilient arm 80 elastically recovers and the stopping surface 92 abuts the limiting plate 42 to prevent the limiting plate 42 from elastically recovering. Thus, the data storage device 10 can be pulled out from the data storage device securing mechanism 100.

The exemplary embodiments shown and described above are only examples. Many details are often found in the art such as the other features of a data storage device securing mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data storage device securing mechanism comprising:
a bracket comprising:
a bottom plate; and
a first side plate connected to a side of the bottom plate, and the first side plate comprising a limiting plate configured to secure a data storage device;
two latch members secured on the first side plate;
wherein one end of each latch member has a hook, the limiting plate is elastically deformable to slide the latch member relative to the bracket, and the hook abuts the limiting plate to prevent the limiting plate from elastically recovering.

2. The data storage device securing mechanism of claim 1, wherein the hook comprises an inclining surface and a stopping surface, and the stopping surface is configured to abut the limiting plate to prevent the limiting plate from elastically recovering.

3. The data storage device securing mechanism of claim 1, wherein the first side plate has a plurality of mounting portions, and the latch member is slidably mounted in the mounting portion.

4. The data storage device securing mechanism of claim 3, wherein each mounting portion defines a cavity, the other end of the latch member has a resilient arm, and the resilient arm is received in the cavity.

5. The data storage device securing mechanism of claim 4, wherein the latch member comprises a body, the hook and the resilient arm are respectively connected with both ends of the body.

6. The data storage device securing mechanism of claim 5, wherein the mounting portion further comprises a securing plate, a through hole is defined between the securing plate and the first side plate, and the latch member can pass through the through hole.

7. The data storage device securing mechanism of claim 6, wherein each end of the body has a barb, the barb is elastically deformed to pass through the through hole to abut the securing plate and to prevent the latch member from waggling.

8. The data storage device securing mechanism of claim 7, wherein the mounting portion defines a gap between the securing plate and the cavity, two latching plates are respectively located at two sides of the cavity, and the latch plate is configured to abut the latch member.

9. The data storage device securing mechanism of claim 1, wherein the first side plate defines a plurality of grooves, the limiting plate is on the groove and elastically connected with the first side plate.

10. The data storage device securing mechanism of claim 9, wherein each side of the data storage device defines a plurality of securing holes, each limiting plate has a positioning column, and the positioning column is configured to be inserted into the securing hole to secure the data storage device.

11. An electronic device, comprising:
a data storage device; and
a data storage device securing mechanism comprising:
a bracket comprising: and
a bottom plate; and a first side plate connected to a side of the bottom plate, and the first side plate comprising a limiting plate configured to secure a data storage device;

two latch members secured on the first side plate;

wherein one end of each latch member has a hook, the limiting plate is elastically deformable to slide the latch member relative to the bracket, and the hook abuts the limiting plate to prevent the limiting plate from elastically recovering.

12. The electronic device of claim 11, wherein the hook comprises an inclining surface and a stopping surface, and the stopping surface is configured to abut the limiting plate to prevent the limiting plate from elastically recovering.

13. The electronic device of claim 11, wherein the first side plate has a plurality of mounting portions, and the latch member is slidably mounted in the mounting portion.

14. The electronic device of claim 13, wherein the mounting portion defines a cavity, the other end of the latch member has a resilient arm, and the resilient arm is received in the cavity.

15. The electronic device of claim 14, wherein the latch member comprises a body, the hook and the resilient arm are respectively connected with both ends of the body.

16. The electronic device of claim 15, wherein the mounting portion further comprises a securing plate, a through hole is define between the securing plate and the first side plate, and the latch member can pass through the through hole.

17. The electronic device of claim 16, wherein each end of the body has a barb, the barb is elastically deformed to pass through the through hole to abut the securing plate and to prevent the latch member from waggling.

18. The electronic device of claim 17, wherein the mounting portion is defined a gap between the securing plate and the cavity, two latching plates are respectively located at two sides of the cavity, and the latch plate is configured to abut the latch member.

19. The electronic device of claim 11, wherein the first side plate defines a plurality of grooves, the limiting plate is on the groove and elastically connected with the first side plate.

20. The electronic device of claim 19, wherein each side of the data storage device defines a plurality of securing holes, each limiting plate has a positioning column, and the positioning column is configured to be inserted into the securing hole to secure the data storage device.

* * * * *